United States Patent
Musaefendic et al.

(10) Patent No.: US 11,988,387 B2
(45) Date of Patent: May 21, 2024

(54) ANNULAR COMBUSTION CHAMBER FOR AN AIRCRAFT TURBOMACHINE

(71) Applicant: Safran Aircraft Engines, Paris (FR)

(72) Inventors: Haris Musaefendic, Moissy-Cramayel (FR); Romain Nicolas Lunel, Moissy-Cramayel (FR); Jean-François Cabre, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/014,326

(22) PCT Filed: Jul. 2, 2021

(86) PCT No.: PCT/FR2021/051209
§ 371 (c)(1),
(2) Date: Jan. 3, 2023

(87) PCT Pub. No.: WO2022/008820
PCT Pub. Date: Jan. 13, 2022

(65) Prior Publication Data
US 2023/0250962 A1  Aug. 10, 2023

(30) Foreign Application Priority Data
Jul. 10, 2020  (FR) .................................... 2007328

(51) Int. Cl.
*F23R 3/50* (2006.01)
*F23R 3/10* (2006.01)

(52) U.S. Cl.
CPC . *F23R 3/50* (2013.01); *F23R 3/10* (2013.01)

(58) Field of Classification Search
CPC .... F23R 3/10; F23R 3/50; F23R 3/283; F23R 3/04; F23R 3/002; F23R 3/60;
(Continued)

(56) References Cited

U.S. PATENT DOCUMENTS

| 5,941,076 | A | 8/1999 | Sandelis |
| 7,908,865 | B2 * | 3/2011 | Cayre ...................... F23R 3/14 239/404 |

(Continued)

FOREIGN PATENT DOCUMENTS

| EP | 0724119 A2 | 7/1996 |
| EP | 0821201 A1 | 1/1998 |

(Continued)

OTHER PUBLICATIONS

International Patent Application No. PCT/FR2021/051209, International Search Report (and translation) and Written Opinion, dated Sep. 23, 2021.

*Primary Examiner* — David P. Olynick
(74) *Attorney, Agent, or Firm* — Kilpatrick Townsend & Stockton LLP

(57) ABSTRACT

Annular combustion chamber for an aircraft turbomachine, said chamber having two coaxial annular walls, an inner annular wall and an outer annular wall, respectively, which are connected upstream by an annular bottom wall of the chamber, wherein an injection device passes through an axis and comprises an air injection system and a frustoconical bowl which is flared downstream and has air passage openings, the chamber further having an annular deflector placed downstream of the bottom wall substantially parallel to the latter; and wherein the air injection system, the bottom wall, the deflector and the bowl are integrally formed.

10 Claims, 4 Drawing Sheets

(58) Field of Classification Search
CPC .. F23R 3/286; F23R 3/14; F23R 2900/03041; F23R 2900/03042
See application file for complete search history.

(56) References Cited

U.S. PATENT DOCUMENTS

| | | | |
|---|---|---|---|
| 2002/0038549 A1* | 4/2002 | Ebel | F23R 3/283 |
| | | | 60/752 |
| 2009/0151359 A1* | 6/2009 | Cayre | F23R 3/002 |
| | | | 60/740 |
| 2021/0199297 A1 | 7/2021 | Chapelle et al. | |

FOREIGN PATENT DOCUMENTS

| | | |
|---|---|---|
| EP | 0821201 B1 | 8/2003 |
| EP | 3115692 A1 | 1/2017 |
| EP | 3141818 A1 | 3/2017 |
| EP | 3115692 B1 | 2/2020 |
| WO | 2019224484 A1 | 11/2019 |

\* cited by examiner

ANNULAR COMBUSTION CHAMBER FOR AN AIRCRAFT TURBOMACHINE

CROSS REFERENCE TO RELATED APPLICATIONS

This application is a national phase application of International Patent Application PCT/FR2021/051209 ("the '209 application"), filed on Jul. 2, 2021 and titled "ANNULAR COMBUSTION CHAMBER FOR AN AIRCRAFT TURBOMACHINE," which application is related to and claims priority benefits of France Patent Application No. 2007328 ("the '328 application"), filed on Jul. 10, 2020. The '209 and '328 applications are hereby incorporated in their entireties by this reference.

TECHNICAL SCOPE OF THE INVENTION

The present invention relates to an annular combustion chamber for an aircraft turbomachine.

TECHNICAL BACKGROUND

The prior art comprises, in particular, the documents WO-A1-2019/224484, EP-A1-0821201 and EP-A2-0724119.

A turbomachine comprises a gas generator comprising in particular one or more compressors, for example low pressure and high pressure, arranged upstream of a combustion chamber.

By convention, in the present application, the terms "upstream" and "downstream" are defined in relation to the direction of gas flow in the turbomachine. Similarly, by convention in the present application, the terms "internal" and "external" are defined radially with respect to the longitudinal axis of the turbomachine, which is in particular the axis of rotation of the compressor rotors.

FIG. 1 partially illustrates a combustion chamber 1 which has an annular shape around an axis A of revolution. The chamber 1 is placed in an annular enclosure 4 radially delimited by an external annular casing 5 and an internal annular casing 6. The chamber 1 is delimited by coaxial internal 11 and external 12 annular walls joined upstream by an annular bottom wall 10 of the chamber. The bottom wall 10 of the chamber 1 is commonly referred to as the chamber bottom 10.

With reference to FIG. 2, the chamber bottom 10 comprises apertures 100 angularly distributed around the axis A and configured to be aligned each with an injection device 13 of a fuel and air mixture. Each injection device 13 may comprise a fuel injector 15 and an air injection system 16.

The injector 15 is angled and has one end fixed to the external casing and an opposite end forming a head which is engaged and centred in the injection system 16.

The injection system 16 is mounted in the aperture 100 of the chamber bottom 10. The injection system 16 comprises, from upstream to downstream with reference to the gas flow, a supporting and centering means 17 of the head of the injector 15, an air injection means 18, and an air-fuel mixture diffusing means 19 into the chamber 1.

In FIG. 2, the means 19 may comprise a frustoconical bowl 19' which is flared downstream and has air passage orifices 190, 190'. The bowl 19' comprises an external annular collar 196 and a frustoconical wall 191. The orifices 190' are formed in the wall 191 and the orifices 190 open in front of the collar 196.

The chamber 1 is supplied with compressed air 7 from the high pressure compressor (not shown) via an annular diffuser 8, and with fuel via injectors 15 distributed angularly around the axis A. The combustion of the air/fuel mixture is initiated by an igniting device 22 and generates heat radiation from downstream to upstream in the direction of the chamber bottom 10. The chamber bottom 10 is thus subjected to high temperatures (generally between 1200 and 2000° C.).

In order to protect the chamber bottom 10, at least one annular deflector 14 (also called heat shield) is placed in the chamber 1 downstream of and facing the chamber bottom 10 in a substantially parallel manner, and at a short distance from the latter. The deflector 14 may be annular or sectorised into a plurality of deflector sectors angularly distributed around the axis A.

With reference to FIG. 3, the deflector 14 is cooled by the impact of air jets also coming from the high-pressure compressor and entering the chamber 1 through cooling air passage bores 20 made in the chamber bottom 10. Thus, the cooling air of the deflector 14, flowing from upstream to downstream, passes through the chamber bottom 10 through the bores 20 and then impacts a part of an upstream face 142a of the deflector 14. The air is then guided radially inwards and outwards from the chamber 1 to initiate, on each of the internal 11 and external 12 walls, a film of cooling air which flows from upstream to downstream.

Furthermore, the collar 196 is also cooled by the impact of air jets coming from the high-pressure compressor and penetrating the chamber 1 through the cooling air passage orifices 190'.

Although this architecture allows for the cooling of part of the deflector 14, the bowl 19' and the chamber bottom 10, it does pose some difficulties, and in particular certain areas of the chamber bottom may not be cooled effectively. For example, the areas where the deflector 14 and the injection devices 13 are attached to the chamber bottom 10 are difficult to cool through the bores 20 and the orifices 190, 190'.

Indeed, in general, the areas 10a of the chamber bottom 10 are cooled and the area 10b of the chamber bottom 10 is not cooled (FIG. 3). The cooled areas 10a correspond to the upstream face 142a of the deflector 14, and an upstream face 196a of the collar 196. The uncooled zone 10b corresponds to the zone where the deflector 14 and the bowl 19' of each injection device 13 are attached to the chamber bottom 10. This attachment zone 10b is particularly subject to high thermal stress, which can alter the performance of the chamber bottom when it is not cooled correctly.

Insufficient cooling of this attachment zone can therefore reduce the lifetime of the chamber bottom and the performance of the combustion chamber of a turbomachine.

The objective of the present invention is to remedy at least in part these drawbacks.

SUMMARY OF THE INVENTION

The invention proposes an annular combustion chamber for an aircraft turbomachine, this chamber comprising two coaxial annular walls, respectively, an internal and an external, which are connected upstream by an annular bottom wall of the chamber, an injection device passing through an axis X and comprising an air injection system, and a frustoconical bowl which is flared downstream and comprising air passage orifices, the chamber also comprising an annular deflector placed downstream of the annular bottom wall of the chamber, substantially parallel to the latter.

The air injection system, the bottom wall, the deflector and the bowl of the chamber are thus integrally formed.

Such a configuration allows to effectively cool the entire annular bottom wall of the chamber while maintaining the integration of the air passage orifices of the frustoconical bowl, to the benefit of the combustion efficiency and more generally of the turbomachine. This configuration also allows to reduce the size of the combustion chamber.

The chamber according to the invention may comprise one or more of the following features, taken in isolation from each other or in combination with each other:
- the deflector comprises an annular portion substantially parallel to the bottom wall and is separated from the bottom wall by a first space;
- the annular portion comprises an internal end with respect to the axis X connected to the bowl and to the bottom wall;
- the bowl comprises a first frustoconical wall and a second frustoconical wall substantially parallel and separated from each other by a second space, the bottom wall and the first frustoconical wall of the bowl having air passage bores in said first and second spaces;
- the wall of the chamber bottom and the first frustoconical wall of the bowl comprising air passage bores in said first and second spaces;
- said orifices of the bowl extend through said frustoconical walls of the bowl and until they open into the chamber;
- said outlets of the orifices of the bowl are located at the junctions between a wall of the annular portion of the deflector and the second frustoconical wall of the bowl;
- each air injection system comprises a primary swirler integrally formed with the bottom wall, the bowl and the deflector;
- each air injection system comprises a secondary swirler and a venturi integrally formed with the bottom wall, the bowl and the deflector, the venturi being disposed between the two swirlers;
- the deflector comprises an annular rim at its external periphery which extends parallel to and spaced from said external wall, and an annular rim at its internal periphery which extends parallel to and spaced from said internal wall;
- said orifices of the bowl are inclined at an angle of between 15 and 75°, said angle being measured with respect to the axis X of said injection device.

A second object of the invention is a turbomachine comprising a combustion chamber as previously described.

BRIEF DESCRIPTION OF THE FIGURES

The invention will be better understood and other details, characteristics and advantages of the invention will become clearer on reading the following description made by way of non-limiting example and with reference to the attached drawings in which.

DETAILED DESCRIPTION OF THE INVENTION

Figure 1:
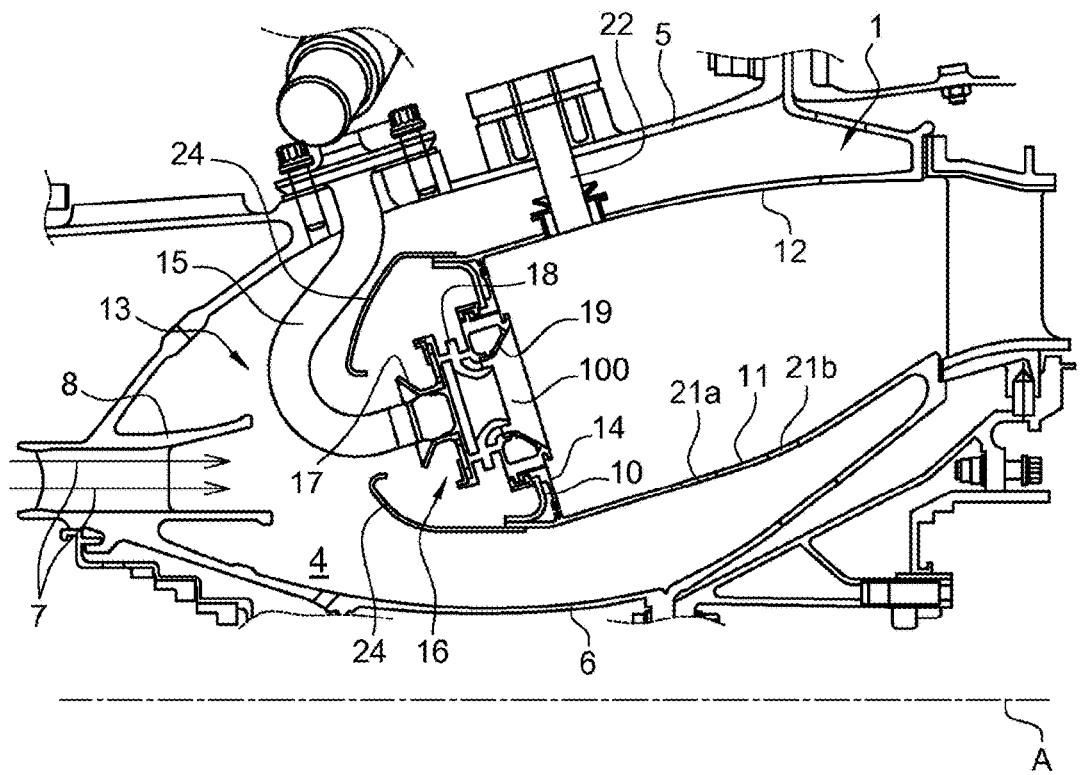
FIG. 1 is a schematic half-view in axial section of a combustion chamber of an aircraft turbomachine according to the prior art.
Figure 2:
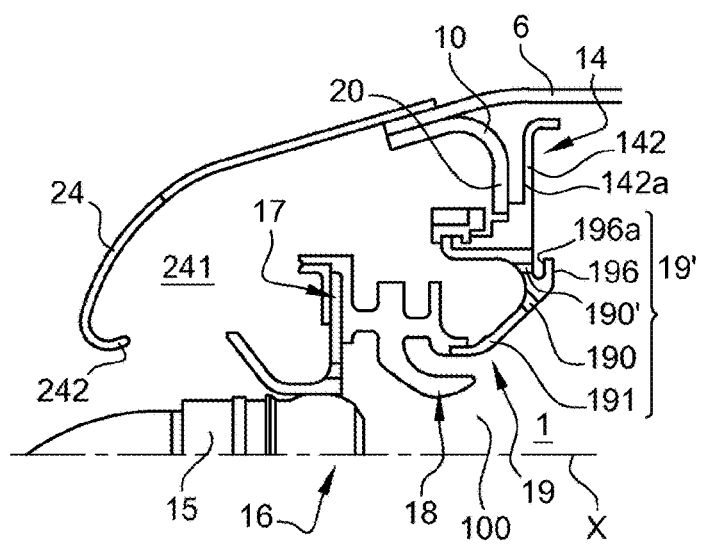
FIG. 2 is a partial schematic view in axial section of a chamber bottom of the combustion chamber of FIG. 1.
Figure 3:
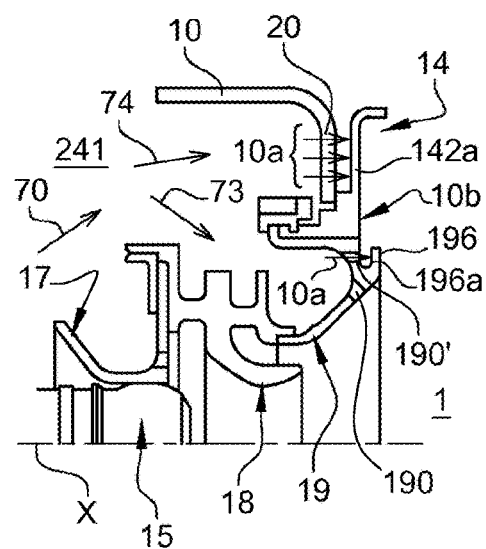
FIG. 3 is a similar view to FIG. 2 and illustrates the cooled and uncooled areas of the chamber bottom of the prior art.

FIGS. 1 to 3 have been described in the foregoing.

An embodiment of the combustion chamber 1 according to the invention is shown schematically in FIGS. 4 to 7.

Figure 4:
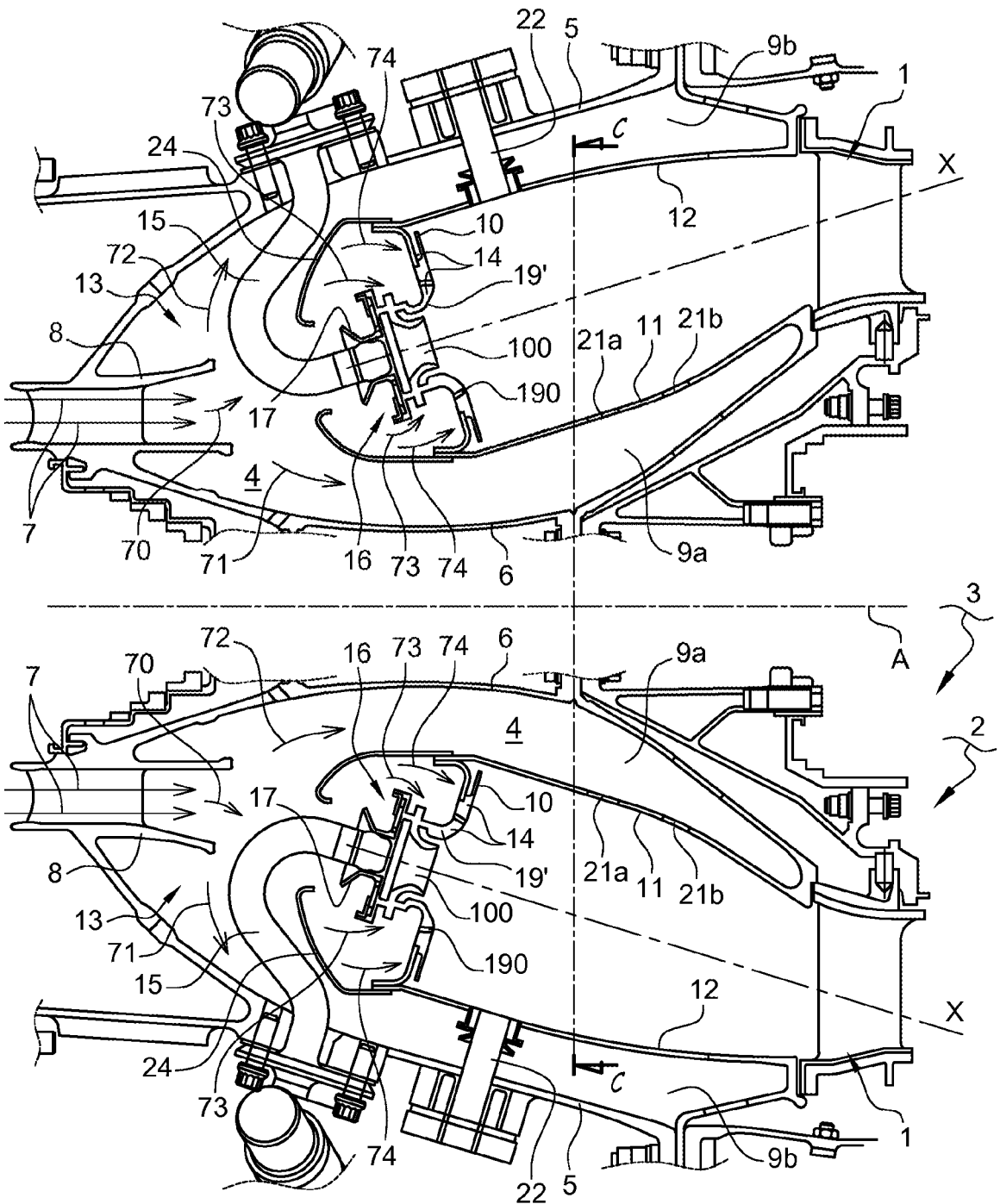
FIG. 4 is a schematic axial sectional view of a combustion chamber according to the invention.

FIG. 4 shows an annular combustion chamber 1 of axis A of revolution of a gas generator 2 of an aircraft turbomachine 3.

The chamber 1 is located downstream of one or more compressors, for example low pressure and high pressure, and upstream of one or more turbines, for example high pressure and low pressure.

The axis A of revolution of the chamber 1 coincides with the longitudinal axis of the turbomachine 3, which is in particular the axis of rotation of the rotors of the compressors and turbines.

The chamber 1 is placed in an annular enclosure 4 radially delimited by an external annular casing 5 and an internal annular casing 6. A compressed air flux 7 generated by the compressors enters the enclosure 4 via an annular diffuser 8.

The chamber 1 is delimited by coaxial annular internal 11 and external 12 walls. The walls 11, 12 are connected upstream by an annular bottom wall of chamber 10 (also called "chamber bottom 10" or "bottom wall 10") which is substantially transverse to the axis A.

According to the embodiment illustrated in FIGS. 4 to 7, the chamber 1 defines on the one hand an annular internal air passage 9a, delimited radially by the internal wall 11 and the internal casing 6, and on the other hand an annular external air passage 9b, delimited radially by the external wall 12 and the external casing 5.

The chamber 1 is supplied with a mixture of air and fuel by several air and fuel injection devices 13 distributed angularly in a regular manner around the axis A. In FIG. 1, each injection device 13 passes through an axis X which is substantially inclined with respect to the axis A of the chamber 1. Each injection device 13 comprises a fuel injector 15 and an air injection system 16.

The injector 15 is angled and has one end fixed to the external casing 5 and an opposite end forming a head which is engaged and centred in the injection system 16, to enable the fuel/air mixture to be sprayed into the chamber 1.

Figure 5:
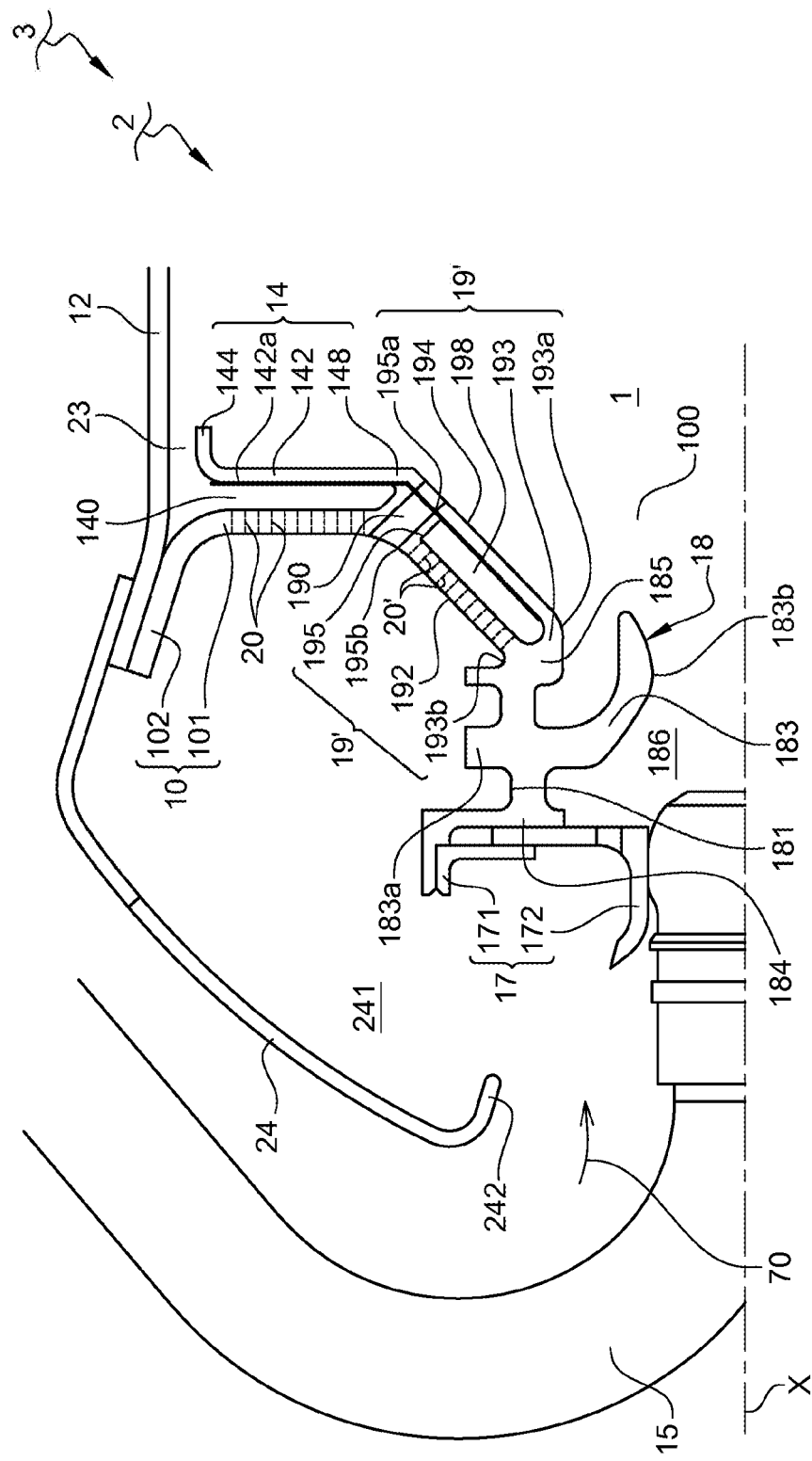
FIG. 5 is a schematic partial axial sectional view of the combustion chamber of FIG. 4.

In FIGS. 4 and 5, the injection system 16 may comprise, from upstream to downstream, means 17 for supporting and centering the head of the injector 15, means 18 for injecting air, and means 19 for diffusing an air-fuel mixture into the chamber 1. More particularly, the means 19 comprise a frustoconical bowl 19' which is flared downstream and having air passage orifices 190 (FIG. 5).

The chamber 1 is thus supplied with compressed air by the injection system 19, this compressed air being mixed with the fuel supplied by the injectors 15.

With reference to FIG. 4, the chamber 1 can also be supplied with compressed air via so-called "primary" holes 21a (for example a circumferential row on the internal wall 11 and on the external wall 12) and via "dilution" holes 21b (for example a circumferential row on the internal wall 11 and on the external wall 12) located downstream of the primary holes 20a. The primary and dilution holes 20a, 20b are supplied with air via the passages 9a, 9b.

According to the example, the chamber bottom 10 is covered upstream by an annular shroud 24 (around the axis A) to thus form with the chamber bottom 10 an annular compartment 241. In the area of each injection device 13, the shroud 26 comprises an opening 242 for the passage of an air flux and for mounting the injector 15.

The combustion of the air/fuel mixture is initiated via one or more igniting devices 22 attached to the external wall 12. According to the illustrated example, the igniting devices 22 are located longitudinally at the primary holes 20a.

In order to protect the chamber bottom 10 in particular from the thermal radiation generated by the combustion, the chamber 1 further comprises at least one annular deflector 14 placed in the chamber 1, substantially opposite bores 20 made in the chamber bottom 10 (FIG. 5).

With reference to FIG. 4, the chamber bottom wall 10 may be segmented circumferentially with respect to the axis A of the chamber 1. Each of the segmented chamber bottom walls 10 may, on the one hand, comprise an aperture 100 for the alignment of the air and fuel injection device 13, and on the other hand, be connected to the deflector 14. Advantageously, each of the apertures 100 in the chamber bottom wall 10 is configured for mounting the injector 15.

A special feature of the invention is that each of the segmented chamber bottom walls 10 is integral with the air injection system 16 and the deflector 14. The air injection system 16 can be mounted in the aperture 100 of the associated chamber bottom wall 10.

More particularly, the air injection system 16, the bottom wall 10, the deflector 14 and the bowls 19' are integrally formed.

According to the embodiment illustrated in FIGS. 4 to 7, the air injection means 18 of the injection system 16, the frustoconical bowl 19', the chamber bottom 10 and the deflector 14 are integrally formed. Alternatively (not shown), the means 17 and 18 of the injection system 16, the bowl 19', the chamber bottom 10 and the deflector 14 are integrally formed.

With reference to FIG. 5, the deflector 14 comprises an annular portion 142 substantially parallel to the bottom 10.

The annular portion 142 comprises an annular rim 144 at its external periphery with respect to the axis X, referred to as the "external rim 144", and which extends downstream substantially parallel to the external wall 12 of the chamber 1. The external rim 144 is spaced from the external wall 12 by an annular space 23 for air passage (FIG. 5). The portion 142 further comprises an annular rim 146 at its internal periphery with respect to the axis X, referred to as the "internal rim" 146 (FIG. 6) and which extends downstream substantially parallel to the internal wall 11 of the chamber 1. This internal rim is spaced from the internal wall 11 by a further annular space 23 for air passage.

This annular portion 142 is separated from the bottom 10 by a first annular space 140. This first space 140 is in fluid communication with the spaces 23.

Furthermore, an upstream face 142a of the portion 142 is disposed substantially opposite and downstream of the wall bottom 10. The upstream face 142a is separated from the bottom wall 10 by the first space 140.

The annular portion 142 comprises an external end and an internal end 148 opposite with respect to the axis X. The external rims 144 and/or internal rims 146 are located on the external end of the portion 142. The internal end 148 connects the deflector 14 to the chamber bottom 10 and the bowl 19'.

In FIG. 5, the chamber bottom 10 comprises an annular wall 101 substantially transverse to the axis X and annular extensions 102 at its external and internal peripheries which extend substantially parallel to the external 12 and internal 11 walls of the chamber 1.

The chamber bottom 10 is fixed upstream to each of the two external walls 12 and internal walls 11 of the chamber 1, by the extensions 102.

The wall 101 is opposite and upstream of the portion 142 of the deflector 14. As described above, the wall 101 is connected to the end 148 of the annular portion 142 of the deflector 14. The bores 20 are made in the wall 101 and these bores 20 open towards the upstream face 142a of the deflector 14. This wall 101 is connected to an external peripheral edge 195b of a downstream end 195 of the bowl 19'. This allows, in particular, to form junctions between the wall 101 and the bowl 19' which are arranged around the orifices 190. Thus, between the orifices 190, each of the junctions comprises a passage for an air flux (for example from a second space 198 and/or the orifices 190).

The bowl 19' comprises a first frustoconical wall 192 and a second frustoconical wall 194 substantially parallel to each other. The frustoconical walls each flare, from upstream to downstream, from the air injection means 18 towards the chamber bottom 10 and the deflector 14. The frustoconical walls 192, 194 are separated from each other by the second space 198. As described above, the first wall 192 is arranged opposite and separated from the second wall 192 by the second space 198. The frustoconical walls 192, 194 are connected to each other by an upstream end 193 and the opposite downstream end 195 separated by the second space 198.

Advantageously, the first wall 192 comprises bores 20' which open into opposite the second wall 194.

The downstream end 195 of the bowl 19' comprises the internal 195a and external 195b peripheral edges opposite each other. As described above, the external edge 195b is connected to the wall 101 of the chamber bottom 10, while the internal edge 195a of the bowl 19' is connected to the wall 142 of the deflector 14.

Figure 6:
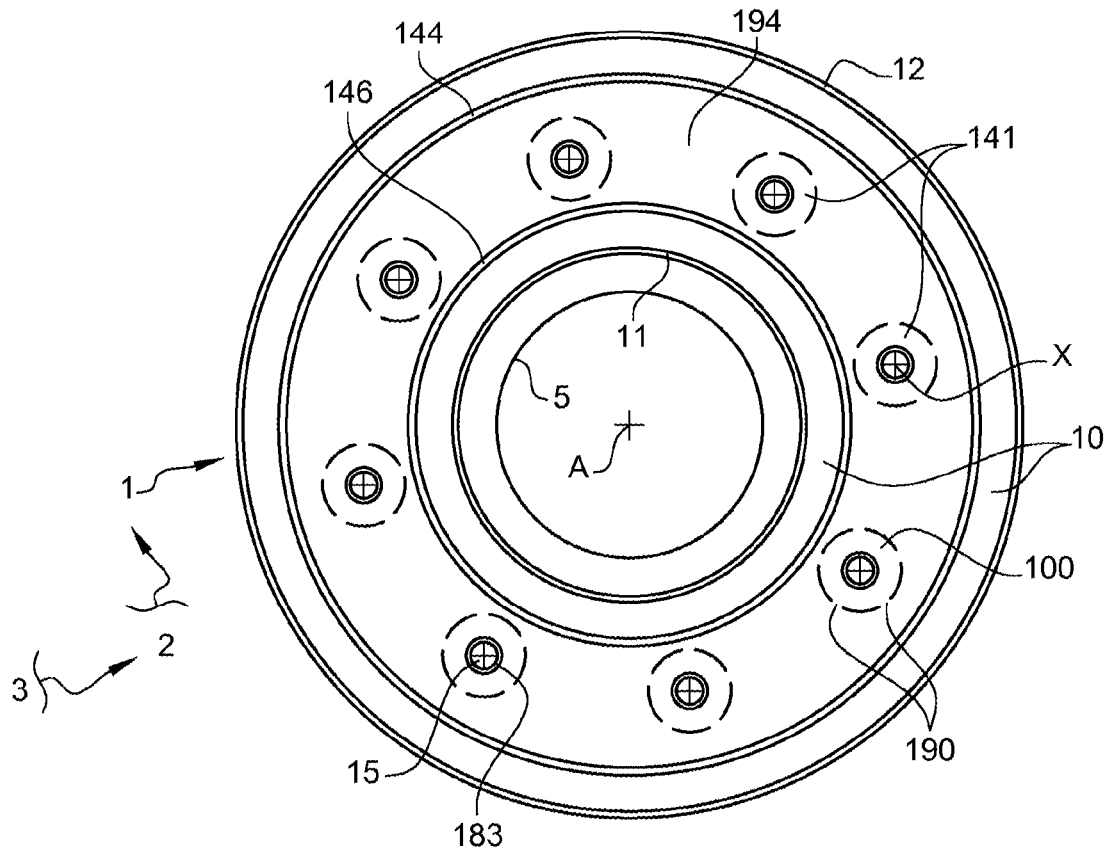
FIG. 6 is a schematic axial cross-sectional view along a C-C sectional plane of FIG. 4, illustrating the upstream side of the combustion chamber.

The downstream end 195 of the bowl 19' further comprises the air passage orifices 190 made and distributed (for example in the form of circumferential rows) around the axes X. These orifices 190 extend through the frustoconical walls 192, 194 of the bowl 19' to open into the chamber 1 (FIGS. 5 and 6). These orifices 190 can also provide a separation between, on the one hand, the chamber bottom 10 and the bowl 19', and on the other hand, the deflector 14 and the bowl 19' (FIG. 5). Thus, the orifices 190 open downstream at the junction between the second frustoconical wall 194 of the bowl 19' and the portion 142 of the deflector 14, and upstream at the junction between the first frustoconical wall 192 of the bowl 19' and the wall 101 of the chamber bottom 10.

In particular, the orifices 190 each comprise an upstream perimeter opening towards the end 195 and the wall 101, and a downstream perimeter opening towards the end 195 and the end 148 of the portion 142.

These orifices 190 may be inclined circumferentially with respect to the axis X. The inclination of the orifices 190 allows, in particular, to rotate the air flux leaving the bowl 19' and to maintain the flame in the chamber 1. Preferably, the orifices 190 are inclined at an angle of between 15 and 75°, in particular at an angle of approximately 45° (FIG. 5). This angle is measured with respect to the axis X.

The upstream end 193 of the bowl 19' is connected, in particular by internal 193a and external 193b peripheral edges of the bowl 19', downstream of the air injection means 18.

FIGS. 4 and 5 represent the injection system 16 in which the air injection means 18 comprise radial swirlers (with respect to the axis X). In an alternative embodiment (not shown), the means 18 may comprise axial swirlers (relative to the axis X).

According to the example, the radial swirlers of the means 18, respectively primary 181 and secondary 182, are coaxial and each delimit a radial air flux with respect to the axis X. An annular venturi 183 is interposed between the two swirlers 181, 182. This configuration allows a mixture of air, coming from the air flows of the swirlers, and fuel, coming from the injector 15, to be injected and then burned in the chamber 1.

With reference to FIG. 5, the venturi 183 is substantially "L" shaped in cross-section and comprises a substantially radial annular rim 183a which is interposed axially between the two swirlers 181, 182. The venturi 183 extends axially with respect to the axis X downstream inside the secondary swirler 182 and separates the air flows from the swirlers 181, 182. In particular, the venturi 183 comprises an internal surface 183b having a neck and delimiting a premixing compartment 186 in which a part of the fuel ejected from the injector 15 mixes with the air flux delivered by the primary swirler 181. This air/fuel premix then mixes downstream of the venturi 183 with the air flux from the secondary swirler 182 to form a cone of sprayed fuel within the chamber 1.

The means 18 comprises a first annular surface 184 upstream of the primary swirler 181, and a second annular surface 185 downstream of the secondary swirler 182. This second surface 185 may be integrated with the upstream end 192 of the bowl 19'. The first surface 184 is configured to be mounted on the means 17 for supporting and centering the head of the injector 15.

The support and centering means 17 comprise coaxial internal 171 and external 172 annular surfaces, respectively. The surface 171 being configured to be mounted on the first surface 184 of the air injection means 18. The surface 172 comprises an internal face configured to position the head of the injector 15. For example, the means 17 are annular centering rings.

In order to protect the various areas of the chamber bottom from the temperature of the burnt gases and the radiation of the flame, a part of the air supplied by the compressor is used to cool these walls.

Figure 7:
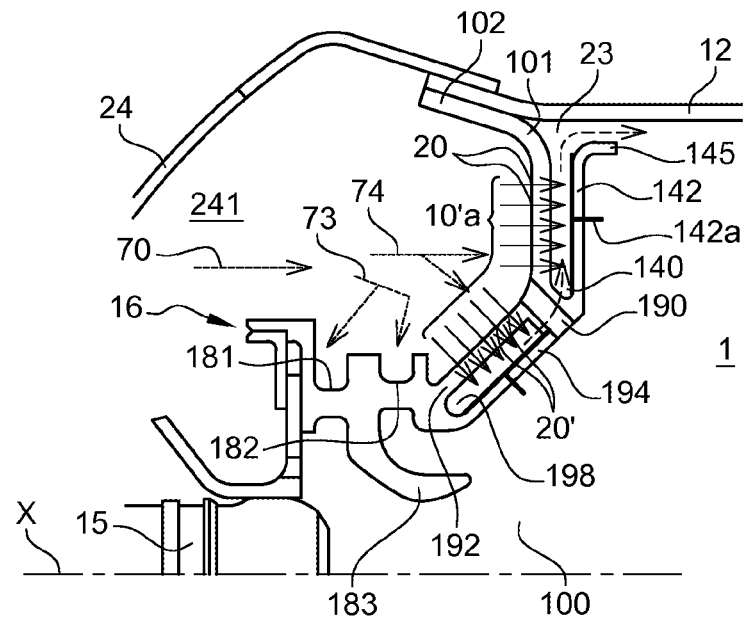
FIG. 7 is a similar view to FIG. 5 and illustrates cooled areas of a bottom of the chamber according to the invention.

As illustrated in FIGS. 4 and 7, at each injection device 13, the compressed air flux 7 generated by the compressor is thus separated at the output of the diffuser 8 into three flux, namely a central air flux 70 entering the compartment 241 via the openings 242, an internal bypass air flux 71 using the internal passage 9a and an external bypass air flux 72 using the external passage 9b.

With reference to FIG. 7, the central air flux 70 is divided at the level of each injection device 13 into, on the one hand, an air flux 73 for supplying the combustion chamber 1 through the primary and secondary swirlers 181 and 182 respectively, and on the other hand, an air flux 74 for cooling the portion 142 of the deflector 14 through the bores 20 and the second frustoconical wall 194 of the bowl 19' through the bores 20'. In fact, the air flux 74 cools, by impact of air jets, both the upstream face 142a through the bores 20 of the wall 101 and an external face (with respect to the axis X) of the second wall 194 through the bores 20' of the first wall 192.

In particular, the cooling air flux 74, passing through the bores 20, passes into the first space 140 and then through the spaces 23. This allows the internal and external walls of the chamber to be cooled by convection. The air flux 74 passing through the bores 20' may also pass into the first space 140 and then through the spaces 23. Advantageously, the second 198 and/or the first 140 spaces may be at least partly in fluid communication through the orifices 190.

Thus, with reference to FIG. 7, the cooled areas 10a' are more extensive (compared to FIG. 3) so as to ensure cooling of the entire chamber bottom 10, as the air flow 74 is capable of effectively cooling the entire wall of the deflector 14, and then being guided radially inwards and outwards of the chamber 1 to generate cooling air films of the internal 11 and external 12 walls.

Advantageously, the cooling air flux 74 also passes through the orifices 190 of the bowls 19'. This allows the orifices 190 to participate in the performance of the combustion chamber, since they allow the air flow in the cone of sprayed fuel upstream of the combustion chamber to be enriched. Indeed, the homogenisation of the air/fuel mixture is thus improved so as to reduce, for example, the production of soot and unburnt hydrocarbon emissions (generally entrained by the cooling air films of the internal and external walls of the chamber, substantially at the level of spaces 23).

The combustion chamber according to the invention provides several advantages which are especially of:
optimising the life of the chamber bottom by improving its cooling;
preserving the air passage orifices of the bowls of the injection devices;
ensuring an optimal connection between the chamber bottom, the injection devices and the deflector;
simplifying the manufacture of the chamber bottom in one integral part;
limiting the number of parts to be attached to the chamber bottom;
reducing the number of parts at the chamber bottom and the overall size of the combustion chamber;
being easily adapted to existing gas generators.

Overall, this proposed solution is simple, effective and economical to build and assemble on an aircraft turbomachine, while ensuring optimal and homogeneous cooling across an entire combustion chamber bottom.

The invention claimed is:

1. An annular combustion chamber for an aircraft turbomachine, the chamber comprising two coaxial annular walls, respectively, an internal and an external, which are connected upstream by an annular bottom wall of the chamber, an injection device passing through an axis and comprising an air injection system and a frustoconical bowl which is flared downstream and comprising air passage orifices, the chamber further comprising an annular deflector placed downstream of the annular bottom wall, substantially parallel to the latter,
wherein the air injection system, the annular bottom wall, the deflector and the bowl are integrally formed,
the deflector comprising an annular portion substantially parallel to the annular bottom wall and separated from the annular bottom wall by a first space, the annular portion comprising an internal end with respect to the axis connected to the bowl and to the annular bottom wall,
the bowl comprising a first frustoconical wall and a second frustoconical wall substantially parallel and separated from each other by a second space, the annular bottom wall comprising [a] first air passage bores [in] opening into said first space, the first frustoconical wall of the bowl comprising [a] second air passage bores [in] opening into said second space, the air passage orifices of the bowl extending through the first and second frustoconical walls until they open into the chamber, the air passage orifices formed by walls that extend between the first and second frustoconical walls, [said] outlets of the air passage orifices of the bowl being located at junctions between a wall of the annular portion of the deflector and the second frustoconical wall of the bowl.

2. The chamber according to claim 1, characterised in that each air injection system comprises a primary swirler integrally formed with the annular bottom wall, the bowl and the deflector.

3. The chamber according to claim 1, characterised in that each air injection system comprises a secondary swirler and a venturi integrally formed with the annular bottom wall, the bowl and the deflector, the venturi being disposed between the two swirlers.

4. The chamber according to claim 1, characterised in that the deflector comprises an annular rim at its external periphery which extends parallel to and spaced from said external wall, and an annular rim at its internal periphery which extends parallel to and spaced from said internal wall.

5. The chamber according to claim 1, characterized in that said orifices of the bowl are inclined at an angle of between 15 and 75°, said angle being measured with respect to the axis of said injection device.

6. A turbomachine, comprising a combustion chamber according to claim 1.

7. The chamber according to claim 1, characterized in that the first space and the second space are in fluid communication via at least one of the air passage orifices.

8. The chamber according to claim 1, characterized in that the air passage orifices provide a separation between, on the one hand, the annular bottom wall and the bowl, and on the other hand, the annular portion of the deflector and the bowl.

9. The chamber according to claim 1, characterized in that the air passage orifices open downstream at the junction between the second frustoconical wall of the bowl and the annular portion of the deflector, and upstream at the junction between the first frustoconical wall of the bowl and the annular bottom wall.

10. An annular combustion chamber for an aircraft turbomachine, the chamber comprising two coaxial annular walls, respectively, an internal and an external, which are connected upstream by an annular bottom wall of the chamber, an injection device passing through an axis and comprising an air injection system and a frustoconical bowl which is flared downstream and comprising air passage orifices, the chamber further comprising an annular deflector placed downstream of the annular bottom wall, substantially parallel to the latter, wherein the air injection system, the annular bottom wall, the deflector and the bowl are integrally formed, the deflector comprising an annular portion substantially parallel to the annular bottom wall and separated from the annular bottom wall by a first space, the annular portion comprising an internal end with respect to the axis connected to the bowl and to the annular bottom wall, the bowl comprising a first frustoconical wall and a second frustoconical wall substantially parallel and separated from each other by a second space, the annular bottom wall and the first frustoconical wall of the bowl comprising air passage bores [in]opening into said first and second spaces, the air passage orifices of the bowl extending through the first and second frustoconical walls until they open into the chamber, the air passage orifices formed by walls that extend between the first and second frustoconical walls,

[said] outlets of the air passage orifices of the bowl being located at junctions between a wall of the annular portion of the deflector and the second frustoconical wall of the bowl, and wherein the first space and the second space are in fluid communication via at least one of the air passage orifices.

* * * * *